(12) United States Patent
Abouelmaati et al.

(10) Patent No.: US 10,912,004 B2
(45) Date of Patent: Feb. 2, 2021

(54) METHOD OF HANDLING A CELL OUTAGE IN A RADIOCOMMUNICATION NETWORK

(71) Applicant: British Telecommunications Public Limited Company, London (GB)

(72) Inventors: Dalia Abouelmaati, London (GB); Richard Mackenzie, London (GB); Michael Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/343,842

(22) PCT Filed: Oct. 4, 2017

(86) PCT No.: PCT/EP2017/075237
§ 371 (c)(1),
(2) Date: Apr. 22, 2019

(87) PCT Pub. No.: WO2018/077583
PCT Pub. Date: May 3, 2018

(65) Prior Publication Data
US 2019/0246329 A1 Aug. 8, 2019

(30) Foreign Application Priority Data
Oct. 28, 2016 (EP) ..................................... 16196346

(51) Int. Cl.
*H04W 36/30* (2009.01)
*H04W 24/04* (2009.01)
(Continued)

(52) U.S. Cl.
CPC ......... *H04W 36/305* (2018.08); *H04W 24/02* (2013.01); *H04W 24/04* (2013.01);
(Continued)

(58) Field of Classification Search
None
See application file for complete search history.

(56) References Cited

U.S. PATENT DOCUMENTS 7,042,837 B1 * 5/2006 Cassiday ................. H04L 45/00
370/225
7,697,456 B2 * 4/2010 Ekl ....................... H04W 84/20
370/254

(Continued)

FOREIGN PATENT DOCUMENTS

CN 101658059 2/2010
CN 101583150 B 4/2011

(Continued)

OTHER PUBLICATIONS

International Search Report and Written Opinion for corresponding PCT Application No. PCT/EP2017/075237 dated Jan. 18, 2018, 16 pages.

(Continued)

*Primary Examiner* — Steve R Young
(74) *Attorney, Agent, or Firm* — Patterson Thuente Pedersen, P.A.

(57) ABSTRACT

In a cellular telecommunications system, outage management is managed in respect of each cell B by a nominated neighbor cell A, the identity of which is recorded in a neighbor list for cell B. If a cell C, D, other than the nominated neighbor, detects a suspected outage in a cell B, the cell detecting the outage identifies the nominated neighbor A from the neighbor list of cell B, and transmits an outage report to the nominated neighbor cell A, which coordinates a handover and outage management process. This avoids multiple detections of the same outage resulting in conflicting attempts to manage the recovery process. Selection of the nominated neighbor of a cell B may be made autonomously by the cell itself or by a centralized processor, (Continued)

and may be done in such a way as to support network resilience by avoiding reciprocity between cells, selecting, for a cell B connected to a first backhaul system, a nominated neighbor A using a second backhaul system, and avoiding the use of cells E having intermittent or transient connections to the network.

14 Claims, 6 Drawing Sheets (51) Int. Cl.
*H04W 36/00* (2009.01)
*H04W 36/16* (2009.01)
*H04W 24/02* (2009.01)
*H04W 36/08* (2009.01)
*H04W 36/18* (2009.01)
*H04W 16/32* (2009.01)
*H04W 84/18* (2009.01)

(52) U.S. Cl.
CPC ..... *H04W 36/00835* (2018.08); *H04W 36/08* (2013.01); *H04W 36/165* (2013.01); *H04W 36/18* (2013.01); *H04W 16/32* (2013.01); *H04W 84/18* (2013.01)

(56) References Cited

U.S. PATENT DOCUMENTS

| | | | |
|---|---|---|---|
| 7,869,348 B2* | 1/2011 | Chao | H04L 12/66 370/225 |
| 9,392,471 B1* | 7/2016 | Thomas | H04W 24/02 |
| 2004/0106408 A1* | 6/2004 | Beasley | H04W 48/08 455/436 |
| 2009/0013210 A1 | 1/2009 | McIntosh et al. | |
| 2009/0117852 A1 | 5/2009 | Loh | |
| 2009/0161556 A1 | 6/2009 | Qian et al. | |
| 2009/0164625 A1 | 6/2009 | Roll et al. | |
| 2010/0208621 A1* | 8/2010 | Morper | H04W 40/246 370/255 |
| 2011/0208992 A1 | 8/2011 | Cohen et al. | |
| 2013/0215768 A1 | 8/2013 | Meloche | |
| 2013/0322234 A1 | 12/2013 | Mohseni et al. | |
| 2014/0086042 A1* | 3/2014 | Van Gruenen | H04W 24/04 370/221 |
| 2015/0009901 A1 | 1/2015 | Gorajala Chandra et al. | |
| 2015/0058481 A1 | 2/2015 | Miller et al. | |
| 2015/0327062 A1 | 11/2015 | Tatavarty et al. | |
| 2017/0257810 A1* | 9/2017 | Gandhi | H04W 4/06 |
| 2018/0279218 A1* | 9/2018 | Park | H04W 36/08 |
| 2019/0141645 A1* | 5/2019 | Abouelseoud | H04W 12/06 |

FOREIGN PATENT DOCUMENTS

| | | |
|---|---|---|
| EP | 2 154 918 A1 | 2/2010 |
| EP | 2 230 864 A1 | 9/2010 |
| EP | 2 693 810 A1 | 2/2014 |
| EP | 2770772 A1 | 8/2014 |
| EP | 2797354 A1 | 10/2014 |
| EP | 2800425 A1 | 11/2014 |
| WO | WO-2008030171 A2 | 3/2008 |
| WO | WO-2015079195 A1 | 6/2015 |
| WO | WO-2015160296 A1 | 10/2015 |
| WO | WO-2016118899 A1 | 7/2016 |
| WO | WO-2017162399 A1 | 9/2017 |
| WO | WO-2017162400 A1 | 9/2017 |

OTHER PUBLICATIONS

3GPP TSG-RAN WG3 #75; Huawei, "Potential solutions for self healing", Agenda Item: 11.2; R3-120128; Dresden, Germany, Feb. 6-10, 2012; 3 pages total.
3GPP TSG-RAN WG3 #74; Huawei, Telefonica, Orange, "Clarification for Self-healing at RAN", Agenda Item: 11.6; R3-112773; San Francisco, US, Nov. 14-18; 3 pages total.
Abouelmaati et al.; "Femtocell Collaborative Outage Detection (FCOD) with Built-in Sleeping Mode Recovery (SMR) Technique" Oct. 24, 2015, Springer, DE, XP055295003, ISSN: 1867-8211, ISBN: 978-3-642-17758-3 vol. 156, pp. 477-486, DOI: 1007/978-3-319-24540-9 39.
Combination Search and Examination Report, Application No. GB1705353.9, dated Aug. 29, 2017, 5 pages.
Combined Search and Examination Report for GB Application No. GB1604866.2 dated Sep. 13, 2016; 6 pages.
Examination Report for GB Application No. GB1604866.2 dated May 8, 2018; 4 pages.
Extended European Search Report, Application No. 17164621.9, dated Sep. 14, 2017, 10 pages.
International Preliminary Report on Patentability for International Application No. PCT/EP2017/054309 dated Sep. 25, 2018; 8 pages.
International Preliminary Report on Patentability for International Application No. PCT/EP2017/054312 completed on May 15, 2018; 10 pages.
International Preliminary Report on Patentability, Application No. PCT/EP2018/052281, dated Mar. 18, 2019, 14 pages.
International Search Report and Written Opinion for International Application No. PCT/EP2017/054309 dated May 12, 2017; 11 pages.
International Search Report and Written Opinion for International Application No. PCT/EP2017/054312 dated Apr. 7, 2017; 10 pages.
International Search Report and Written Opinion, Application No. PCT/EP2018/052281, dated Apr. 5, 2018, 15 pages.
Wang et al.; "Cooperative Cell Outage Detection in Self-Organizing Femtocell Networks" INFOCOM, 2013 proceedings IEEE, Apr. 14, 2013, XP032440824, DOI: 10.1109/INFCOM.2013.6566865 [retrieved Dec. 3, 2018]; 9 pages. http :1 /www. cse. ust.hk/ ~gswwang/ W ei _ fil es/papers/infocom 13 _cod. pdf.
Application and Filing Receipt for U.S. Appl. No. 16/085,765, filed Sep. 17, 2018, Inventor: Abouelmaati.
Application and Filing Receipt for U.S. Appl. No. 16/085,781, filed Sep. 17, 2018, Inventor: Abouelmaati.
Application and Filing Receipt for U.S. Appl. No. 16/500,589, filed Oct. 3, 2019, Inventor: Abouelmaati.
Examination Report for GB Application No. GB1618269.3 dated Mar. 16, 2017; 5 pages.
Extended European Search Report, Application No. 16196346.7, dated Feb. 27, 2017, 14 pages.
Chinese Office Action, Application No. 201780066966.7, dated Oct. 8, 2019, 4 pages.
Chinese Search Report, Application No. 201780066966.7, dated Oct. 8, 2019, 2 pages.

* cited by examiner

Figure 1

| Cell | Channel characteristics | GPS | Type | Nominated Neighbour | Other neighbours |
|---|---|---|---|---|---|
| A | ............ | ...... | Pico | C | B, D |
| B | ............ | ...... | Macro | A | C |
| C | ............ | ...... | Macro | D | A, B |
| D | ............ | ...... | Macro | A | C, E |
| E | ............ | ...... | Femto | D | |

METHOD OF HANDLING A CELL OUTAGE IN A RADIOCOMMUNICATION NETWORK

CROSS-REFERENCE TO RELATED APPLICATION

The present application is a National Phase entry of PCT Application No. PCT/EP2017/075237, filed Oct. 4, 2017, which claims priority from EP Patent Application No. 16196346.7 filed Oct. 28, 2016 each of which is hereby fully incorporated herein by reference.

TECHNICAL FIELD

The present disclosure relates to cellular communications, and in particular to the maintenance of cellular communications coverage during a shutdown of one or more base stations.

BACKGROUND

When a shutdown of one or more base stations happens, any mobile stations that were registered with the base station that has shut down, whether currently on a call or just on standby, have to register with another base station within range, so that calls can continue to be connected to and from the mobile stations.

In a normal handover, the base station from which the handover takes place controls the process, for example identifying when signal quality is deteriorating, identifying (e.g. from a "neighbor list") the base stations to which handover could be made and how the mobile unit is to identify them, and synchronizing the handover process itself. This is not possible if the base station has shut down unexpectedly. Instead, the mobile unit has to initiate the process, seeking any base stations within range and registering with one of them. This process is much slower, particularly if several mobile terminals are having to do this at the same time, which is usually Is the case if a base station has shut down without warning.

Self-Organizing Networks (SONs) have an important role in the development of the next generation mobile networks by introducing automated self-healing schemes. One of the main functionalities in a self-healing mechanism is the detection of a condition that requires healing, in this case a cell outage detection.

It is important to detect base station outages promptly in order to provide a reliable, high quality mobile service. If millions of base stations are deployed, it will be impractical to respond manually to individual base station outage, especially as this could be triggered by customers turning off their base stations.

In this specification, the term "base station" is used for the physical equipment forming the interface between the fixed network and a wireless connection with a mobile terminal. The terms "femtocell", "picocell" and "macrocell" are conventional terms for different types of base station equipment, as will be discussed later. In this specification the term "cell" is used in the sense of the geographical area for which a base station provides coverage.

It is expected that future cellular networks will be heterogeneous networks (HetNets), i.e., a mix of large fixed base stations (macro-cells) for ubiquitous user experience and small portable base stations (known as femtocells) for high data rate transmission. Most outage detection processes are focused on macro-cells rather than small cells. Most previous outage detection processes are not suitable for such networks due to the dense deployment nature of small cells, as compared to the macro only deployments. Furthermore, user statistics in small cells are likely to be sparse, since they usually support relatively few users at any given time.

The outage of a base station may be detected by its local home router but it is not possible to report this if the fault is with the router itself. Femtocells can also be monitored from a centralized management or network platform, by polling them from a centralized platform to check their status. Again this relies on the local router being operational, but in this case if the polling ceases to produce a response that is itself indicative of a problem with the base station, and specifically with its backhaul connection to the network. Base stations can also be monitored by neighboring cells, for example using Internet protocols over the X2 interface (Inter-eNodeB interface defined in 3GPP).

These IP-based techniques are likely to result in overload of the network, especially as it is expected that thousands or even millions of base stations could eventually be deployed. Polling using the X2 interface also generates additional network traffic, and suffers from the same reliability issues as centralized polling. Polling from the local router may be useful (especially in cases where there are no neighbor Femto cells to report an outage) but is at risk of a common failure mode (hardware/power/backhaul), in which it may be unable to report outages.

It is known from EP2230864 and EP2154918 for an individual cell to co-ordinate a fault recovery process in the event of a failure identified in a nearby cell. However, this process requires an initial negotiation process to be performed when a fault is detected to select which, of several base stations that may have detected the fault, should co-ordinate this remedial action. This extra negotiation step is inconvenient as it takes extra processing time which can delay the initiation of the recovery process, increasing the duration of a service interruption. It may also have to be run several times as more base stations detect the faulty one and attempt to enter the negotiation process.

SUMMARY

This specification will generally describe situations in which an actual outage (failure of a cell) has occurred, and embodiments can also be applied in situations where such an outage or overload condition appears imminent, for example manifesting itself as a reduction in signal quality. It is of course desirable to intervene before the actual failure of the cell, in order to avoid interruption to service, and discussion herein of the identification of outages includes identification that an outage may be imminent.

According to the present disclosure, there is provided a fault detection process for a cellular communications system comprising a plurality of base stations, in which each base station maintains a neighbor list to identify nearby base stations to which mobile terminals may be handed over, the neighbor list identifying, for each nearby base station, a nominated neighbor base station, and wherein if a first base station detects an outage or deterioration in signal quality of a second base station, the first base station retrieves data from its neighbor list to identify the nominated neighbor of the second base station and transmits a report of such outage or deterioration in signal quality to the nominated neighbor base station so identified, and the nominated neighbor base station, on receiving the report from the first base station, responds by monitoring for potential outages or deterioration in signal quality of the second base station and for coordinating handover and outage management processes in to response to such reports.

The disclosure also provides a cellular base station having a neighbor detection processor for detecting the presence of neighboring base stations, and a store for recording the identities of neighboring base stations so detected, and for recording for each neighboring base station a predetermined nominated neighbor base station, the neighbor detection processor being arranged to identify a deterioration in signal quality of a base station previously recorded in the store, to determine from the neighbor list the identity of the predetermined nominated neighbor of the base station suffering a deterioration in signal quality, and to generate a report for transmission to the nominated neighbor to initiate a handover and outage management process. The disclosure also provides a cellular base station having a neighbor detection processor for detecting neighboring base stations, and a store for recording the identities of neighboring base stations so detected, for recording for each neighboring base station a nominated neighbor base station, wherein it is itself recorded as the nominated neighbor base station for at least one other base station, and comprising: a receiver adapted to receive a report from a first base station indicating an outage or deterioration in signal quality of a second base station for which it is the nominated neighbor; a processor adapted to respond to the outage detection report by initiating handover and outage management processes for the second base station.

The nominated neighbor base station may have a handover management processor (37) for managing handover of mobile terminals between base stations, the handover management means being arranged to manage a handover and outage management process in response to reports of outages or deterioration in signal quality relating to the second base station, received from other base stations, or if the neighbor detection processor identifies that it is itself the nominated neighbor of the outaged base station, it co-ordinates the outage management process.

A base station may embody both aspects, serving as nominated neighbor for a first base station, and having the capability to detect outages or potential outages in other base stations and report them to the respective nominated neighbors of those other base stations. Such a base station may also itself have a nominated neighbor allocated to it, to allow handling of outages in that base station. However, the three functions need not all be present in every base station in the network.

In an alternative embodiment, some of the functions are embodied in a cellular communications management processor for managing a cellular communications network, the cellular communications management processor comprising a base station management system for receiving location data relating to individual base stations in the network and a is neighbor data store for storing location data of each base station in relation to neighboring base stations, comprising a nominated neighbor selection processor for selecting, in relation to each base station, a nominated neighbor base and storing data relating to the nominated neighbor in the neighbor data store, and an outage management system for receiving reports from a first reporting base station relating to a second base station suffering an outage or deterioration in signal quality, identifying from the data in the store the nominated neighbor of the second base station, generating a further report, and transmitting the further report to the nominated neighbor so identified to initiate a handover and outage management process.

In an embodiment of the disclosure, a neighbor list is maintained for the first base station to identify other base stations to which mobile terminals may be handed over, and further base stations retrieve data from the neighbor list in order to initiate a handover process, wherein the neighbor list records the nominated neighbor of the first base station, and a further base station detecting an outage or deterioration in signal quality of the first base station retrieves data from the neighbor list to identify the nominated neighbor to which an outage report is to be transmitted. The nominated neighbor base station may generate and transmit instructions to the further base stations to initiate a handover and outage management process.

The cellular base station may have a neighbor determination processor for selecting a neighboring base station, from data in the neighbor list, to be the nominated neighbor of the base station, and storing that identity in the neighbor list.

The identity of the nominated neighbor base station may be broadcast, either by the central processor or by the base station itself, to the said nominated neighbor base station and to other neighboring base stations.

In one embodiment nominated neighbors of base stations can be selected in such a way that no two base stations are each other's nominated neighbors. In respect of a base station connected to a first backhaul system, a base station connected to a different backhaul system is preferably selected as nominated base station. An automated allocation system may operate to allocate nominated neighbors to individual base stations according to these or similar criteria.

If a base station detects a potential outage in another base station for which it is not the nominated neighbor, it can report the potential outage to the nominated neighbor base station is and takes instructions from the nominated neighbor base station for handover and outage management This process allows more efficient handover and outage management, as it reduces conflicts between outage reports and recovery actions which could be initiated if no individual neighbor were in overall control. This offers significant reduction in the communication overhead and detection delay. As the system does not rely on user interactions, it can detect outages when few or no users are in the vicinity, and in areas of low cell density.

Moreover, it can give a representative reflection of outage from the customer point of view by using a Power-based detection approach, and can avoid false outage alarms generated during accidental unplugging or rebooting of the base station (instantaneous outages).

To facilitate handover, it is conventional for each base station to maintain a "neighbor list", identifying the channels and other details relating to base stations in the vicinity to which a mobile terminal may be likely to hand over. This neighbor list can be updated by a central control system or, in a more dynamic system, by interaction between base stations that can detect each other directly, or in response to information relayed by mobile handsets as they are handed over. In a preferred embodiment a base station records, as part of the information about each neighbor in its neighbor list, the identity of that neighbor's nominated neighbor.

The nominated neighbor relationship does not need to be reciprocal—indeed a reciprocal arrangement can be undesirable as, if there is a fault affecting both of them, neither will be able to manage a handover and outage management process for the other. Some base stations in the network may be "nominated neighbor" to several other base stations, and others to none.

In some embodiments the nominated neighbor can be selected to have a different backhaul system (different layer of the cellular plan) so that if the base station failure is because of a problem in the backhaul network, the nominated neighbor is unaffected.

In one embodiment, the process is based on sequential triggering for base station outage detection. The base stations may be of any wireless cell type (e.g. macro, micro, pico or femto), and in particular it is advantageous if more than one type interact so that the network as a whole is more robust to a system failure affecting several base stations of one type.

Any base station identifying another base station as potentially in outage can initiate the process. It first identifies from its neighbor list which base station is the "nominated neighbor" of the suspected outage base station. It then communicates with the nominated neighbor to report the potential outage. Note that the "nominated neighbor" is not necessarily one of the base stations on the neighbor list of the base stations on the neighbor list of the base station reporting the outage.

The nominated neighbor is then responsible to make an outage decision. This may be done based on its own measurements, but can also involve the nominated best neighbor coordinating actions with other entities, such as other neighbor's of the suspected outaged base station, for example to determine if the suspected base station can be detected by any of its neighbor's.

Action can then be taken, again coordinated by the nominated neighbor, to manage handovers in a coordinated manner to avoid overloading some neighbors whilst there is spare capacity at others. It will be noted that standard handover processes require the cooperation of the currently-serving base station as well as the station to which the mobile terminal is to be handed. This may not be possible in the event of a sudden outage of the currently-serving base station. In such a case the actions normally taken by the currently serving base station (e.g. transmitting a message to the mobile terminal identifying beacon identities of neighbor cells) are instead performed by the nominated neighbor.

The nominated neighbor is also responsible for reporting the outage to a control center. Having only one base station responsible for such reports reduces the signaling overhead to the control center, and also provides more reliable reporting as the report is a coordinated response based on co-operation with the other neighbors'.

Once the outage detection is confirmed for a certain base station, the "nominated neighbor" may report it to a centralized Operation Administration and Maintenance (OAM) processor. The OAM and the nominated neighbor could co-operate to perform further investigations and collect data about the outaged base station. This could help in identifying the original cause of the outage, and allow patterns/trends to be monitored (i.e. clusters of alarms should be investigated for a common route cause). Base station Outage can be caused by several mechanisms, for example RF failure, or not fully functioning, software failure, backhaul failure or power failure.

Having only one base station responsible for such reports reduces the signaling overhead to the control center, and also provides more reliable reporting as the report is a coordinated response based on co-operation with the other neighbors.

The process has a number of advantages. Firstly, the sequential triggering allows any entity (cell or non-cell) to inform the nominated neighbor if it has reason to suspect that a base station is in outage. The best neighbor then makes the decision and will involve other entities when needed to help with the decision making. This reduces the amount of active monitoring required, so that the system may be reactive to the detection of faults rather than actively monitoring for them. This is also more energy efficient, and allows fast automated outage detection with a very low communication overhead.

The system's operation and reliability are independent of the density of users. Each base station has exactly one nominated neighbor, however dense or sparse the network coverage.

The detection process avoids reporting instantaneous outages, thereby increasing the network efficiency as the base station will not report the outage until it is confirmed that it is not an accidental removal or rebooting of the base station. That will avoid false reports as an outage in these cases, and minimizes the cost and effort generated by false alarms and misdetection.

Reporting can be over the backhaul network, which means it does not overload the mobile core network.

Finally, as detection is carried out by detection of outages over the air interface it accurately reflects the customer's experience, in particular whether an outage is detectable by the customer.

BRIEF DESCRIPTION OF THE DRAWINGS

An embodiment of the disclosure will now be described, with reference to the drawings, in which.

DETAILED DESCRIPTION

The embodiments to be described below generally describe remedial action taken after an outage has already occurred. It will be appreciated that if the base station in question has not yet failed completely it may be able to participate in the remedial measures initiated by its nominated neighbor.

Figure 1:
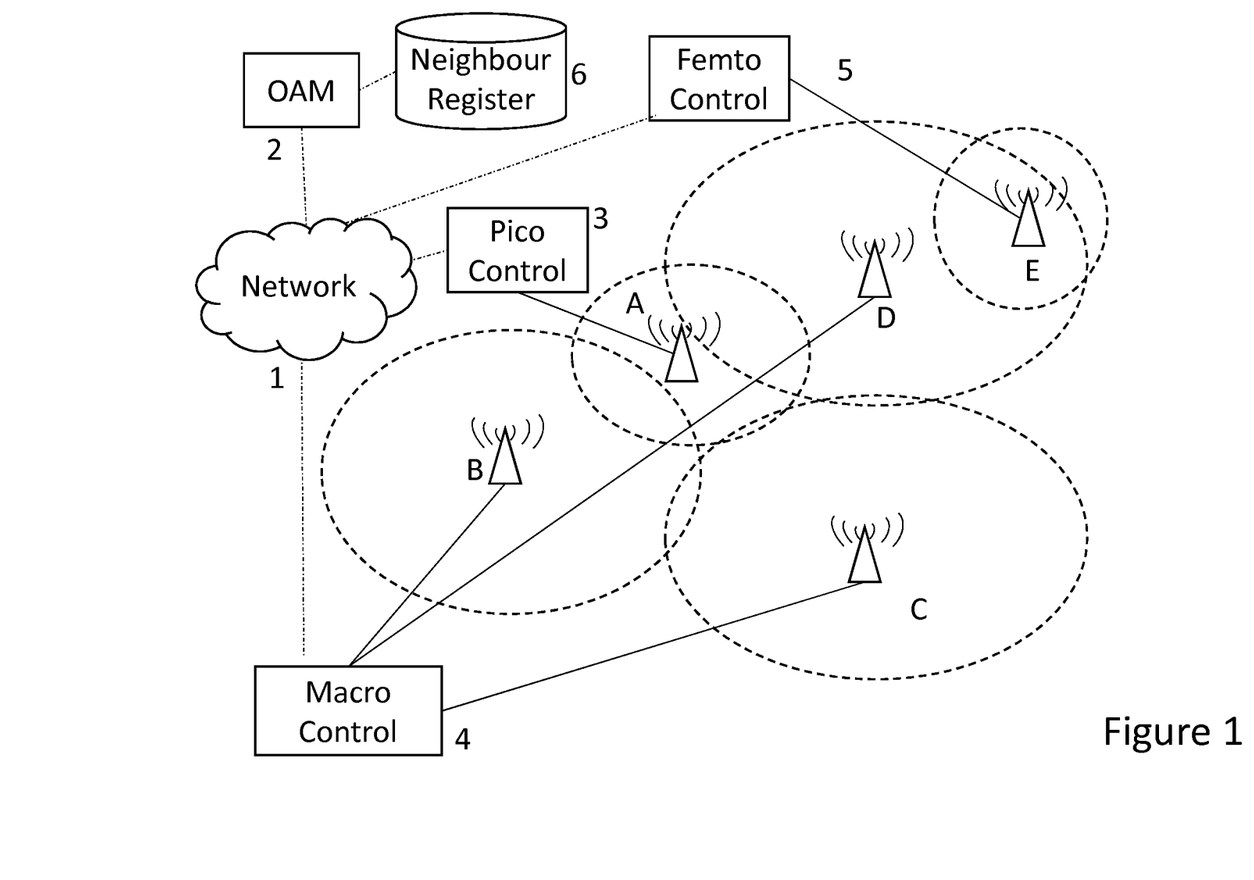
FIG. 1 is a schematic diagram of part of a cellular network capable of operation according to the disclosure.

FIG. 1 depicts a simplified cellular network having five base stations, labeled A, B, C, D and E, and each having a respective area of coverage, depicted approximately by a respective dashed curve. (It will be appreciated that signal quality falls off gradually with distance, and can be affected by varying levels of attenuation and interference at different times, so there is no clearly defined boundary to the area covered by a particular base station.) The base stations are of various types, with different backhaul connections to different control centers which can intercommunicate through a core network 1 and are coordinated by an Operations, Administration, and Maintenance (OAM) server 2. More specifically, base station A is a picocell connected to, for example, a private network 3, base stations B, C and D are all standard macrocell base stations with backhaul connections to a cellular core network 4, and base station E is depicted as a femtocell with a backhaul connection (typically using an internet connection) to a femtocell control center 5, The three backhaul networks 3, 4, 5 can all communicate with each other through the core network 1.

Figure 2:
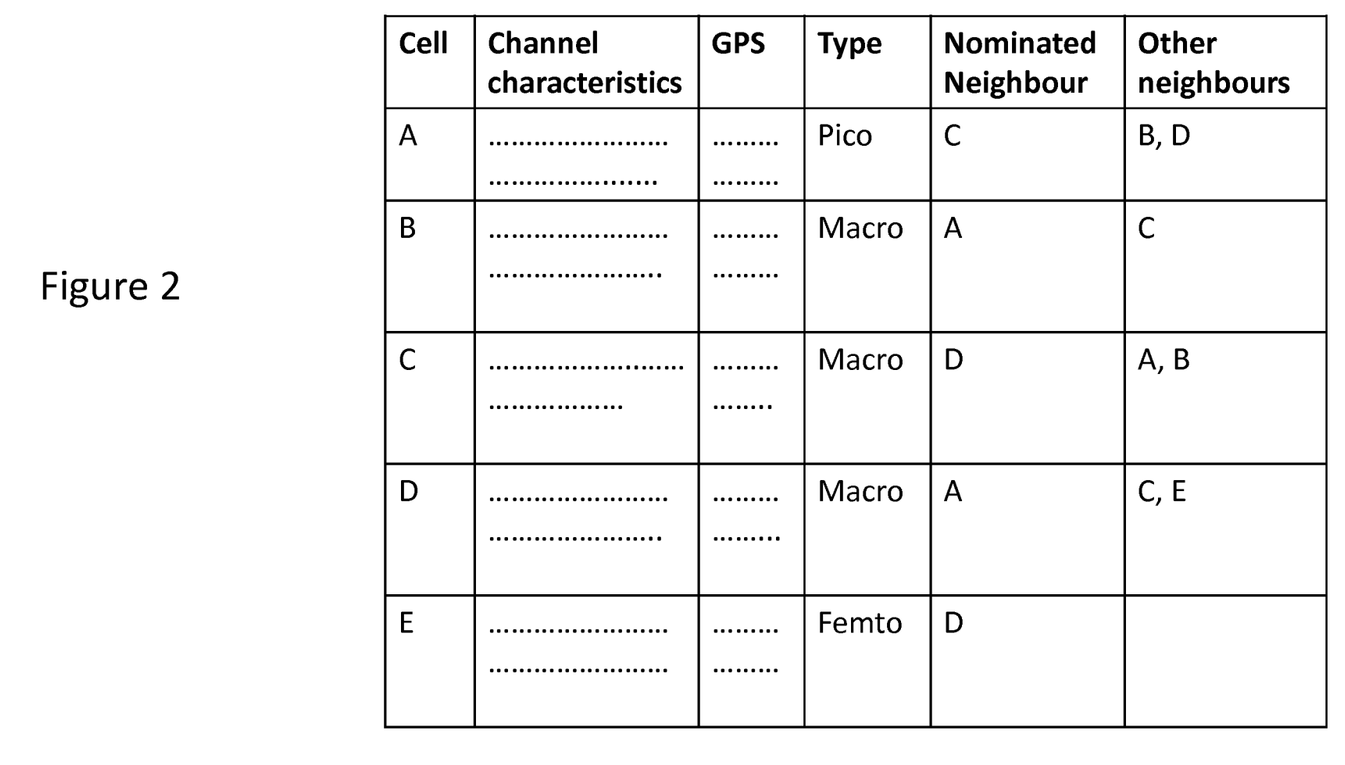
FIG. 2 is an example neighbor list for the base stations depicted in FIG. 1.

A neighbor register 6 is maintained which stores details of base stations recorded as being in proximity to each other, such that handover can be performed between them. The primary purpose of this neighbor register is to simplify the handover process by passing information to a user terminal relating to the operational channels of the base stations to which it is most likely to be able to connect, thus allowing it to seek signals for those base stations first. In FIG. 2 the register 6 is shown as a single entity associated with the OAM 6 accessible from all the individual backhaul systems 3, 4, 5 through the core network, but in practice duplicate registers may be maintained by some or all of the backhaul systems 3, 4, 5, storing only the information required by the base stations which it controls: that is to say, for each such base station, the identities of its neighbors, their locations, and their channel characteristics. Thus, for example, picocell A is recorded as having three neighbor base stations B, C, and D, and the channel characteristics of those base stations can be retrieved from the respective entries for those base stations. Likewise, femtocell E has only one neighbor, namely base station D, as its small area of coverage, close to the centre of that cell, does not overlap with is any other cell.

Note that in general the neighbor relationship is reciprocal: for example, the neighbor list of base station A includes base stations B, C and D, and the neighbor lists of base stations B, C and D all include base station A.

In this embodiment of the present disclosure, the register 6 also stores, for each base station, the identity of one "nominated" neighbor. The "nominated neighbor" would typically monitor the behavior of the neighbor base station more closely than other base stations.

In some embodiments, the selection of nominated neighbors can be automated, by applying a rulebased system whenever a base station is added to the system, to identify base stations which should be on its neighbor lists, and which of those should be its "nominated" neighbor. Similarly, if a base station is removed from the network, any base stations for which it was the nominated neighbor need to be assigned a replacement.

Figure 3:
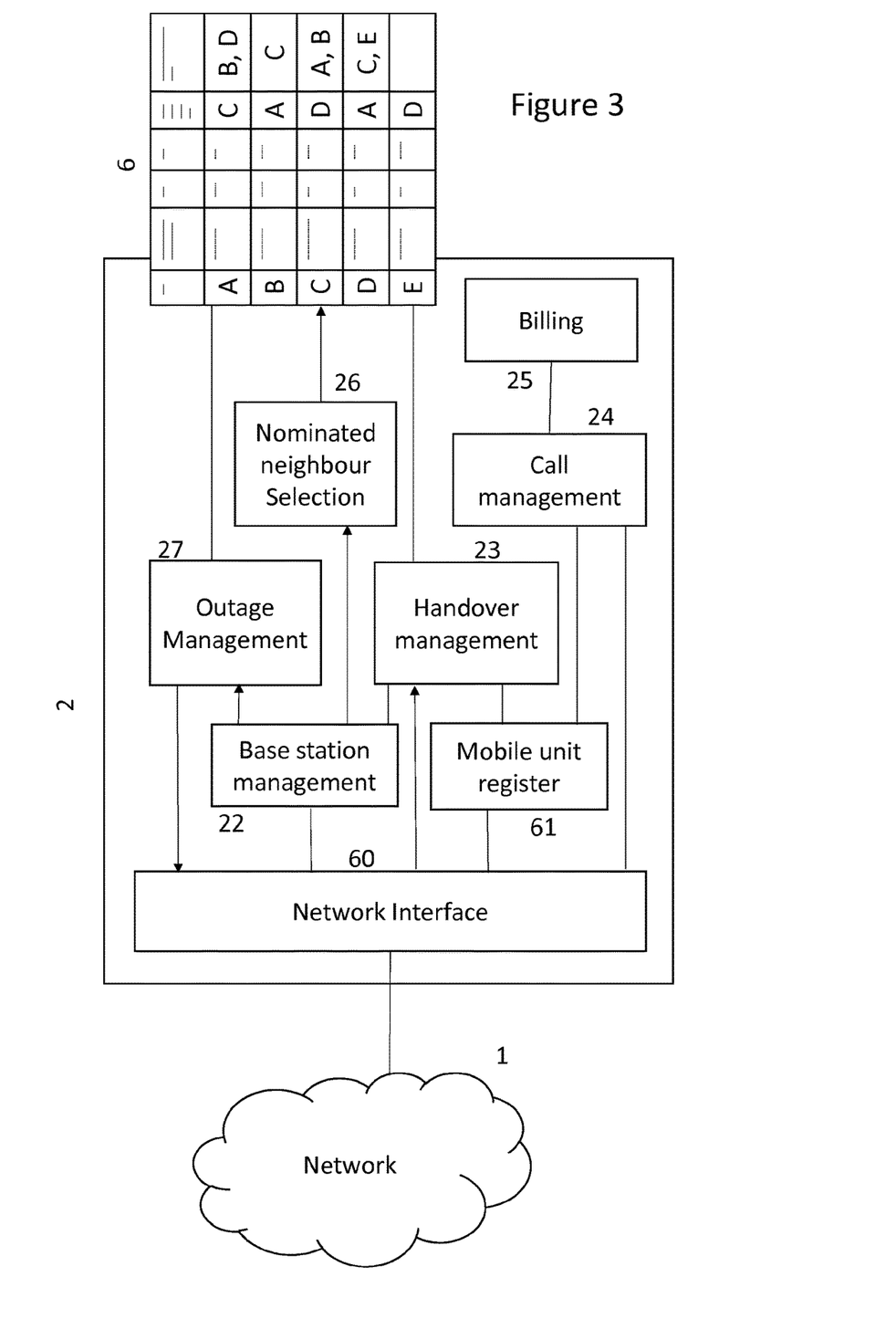
FIG. 3 is a schematic diagram of an Operations, Administration, and Maintenance centre of the cellular network of FIG. 1, configured to operate according to the disclosure.

FIG. 3 depicts the functional elements of the Operations, Administration, and Maintenance centre (OAM) 2 of FIG. 1. FIG. 3 depicts a network interface 60 through which the OAM 2 connects with the network 1. The OAM maintains a register 61 of mobile units which stores data relating to mobile user terminals registered with the system, including access rights to the network, and information relating to the base station to which each mobile terminal is currently connected. A base station management system 22 monitors the operation of the base stations of the system, including any reports received from the base stations of outages or other deterioration in signal quality, and any control data for their operation.

For brevity, the term "outage" will be used in the following to include any condition, such as a significant reduction in signal quality, which reduces the capabilities of a base station or is indicative that a failure may be imminent. Thus the term "outage report" includes a report that an outage may be imminent, allowing a proactive response than reacting to an outage only after it has occurred. Such proactive action can be less disruptive to users, and in particular to call or session continuity.

A handover management system 23 receives data from the base station management system 22, including handover requests forwarded by the base stations from mobile terminals cooperating with them, and transmits instructions to effect a handover and update the location information in the mobile unit register 21 relating to the mobile unit that has been handed over.

A call management system 24 manages calls and session requests received over the network interface 20 in respect of the mobile users recorded in the register 21, in particular to determine, from the information in the register 21, whether the user is authorized to use the service requested and, in the case of incoming traffic, to direct that traffic to the base station currently serving the mobile terminal. The call management system 24 also generates data required for billing and other subscriber functions 25.

As well as these conventional functions, the OAM system of this embodiment comprises a nominated neighbor selection function 26 and an outage management function 27, which will be described in more detail below with reference to FIGS. 4, 5 and 6.

Figure 4:
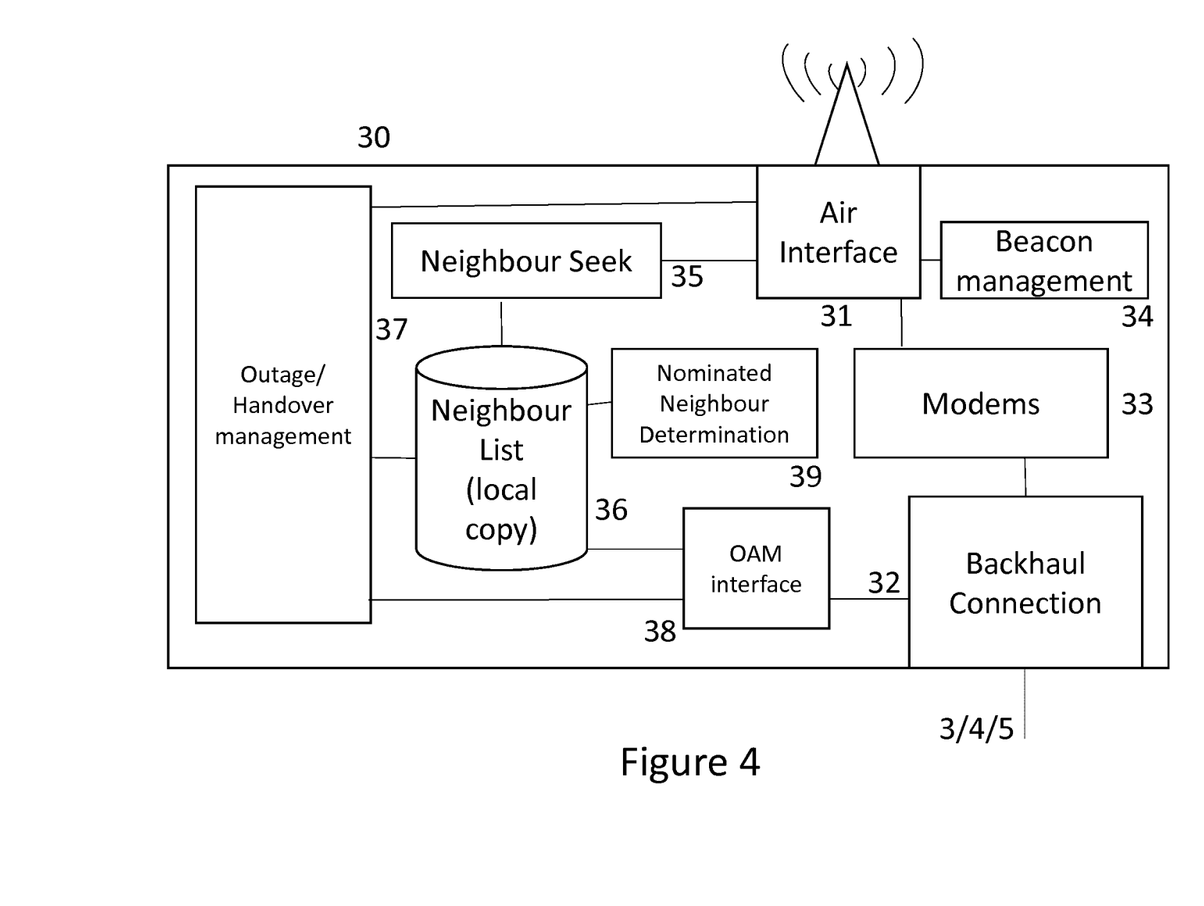
FIG. 4 is a schematic diagram of a base station of the cellular network of FIG. 1, configured to operate according to the disclosure.

FIG. 4 depicts the functional elements of a generic base station 30 adapted to operate according to this embodiment, depicting the elements that co-operate in the performance of this embodiment. The base station may be any type of cellular base station, such as the picocell A, femtocell E, and macrocells B, C, D of FIG. 1, and the details of their operation and in particular the nature of their backhaul links 3, 4, 5 will vary according to the type of base station.

The base station comprises an "air interface" for transmitting and receiving wireless signals to and from mobile user terminals, a backhaul interface 32 for connection to the fixed network 3, 4, 5, and one or more modems 33 for converting signals between the backhaul and wireless systems. A beacon management system 34 generates signals for broadcast over the air interface 31 to alert other base stations to its presence, and a neighbor seek function 35 operates to detect such signals being broadcast by other base stations, allowing the base station to compile a listing of base stations nearby in a neighbor list store 36. The beacon signal may include data such as channels available, backhaul system and geographical location (determined for example by a GPS receiver). The neighbor list 36 is used to control a handover 5 management system 37 which co-ordinates the transfer of a mobile terminal's connection from the base station to another base station, or vice versa. This process includes receiving information through the air interface 31 from the mobile terminal that a handover is required, for example because signal quality is deteriorating, and transmitting instructions to the mobile terminal to switch to a channel operated by the base station to which it is to be handed over. It also requires communication with the OAM 2, through an interface 38, to update location registers and thus ensure calls and session data are routed to the mobile terminal after the handover is complete.

The data in the neighbor list 36 is shared, through the OAM interface 38, with the OAM 2 and thus with the master neighbor list 6, and conversely data relating to the neighboring base stations can be transmitted back to the neighbor list 36.

The neighbor list 36 has associated with it a processor 39 for determining which of the base stations in the neighbor list should be selected as its "nominated neighbor", and the operation of that processor will now be described.

Figure 5:
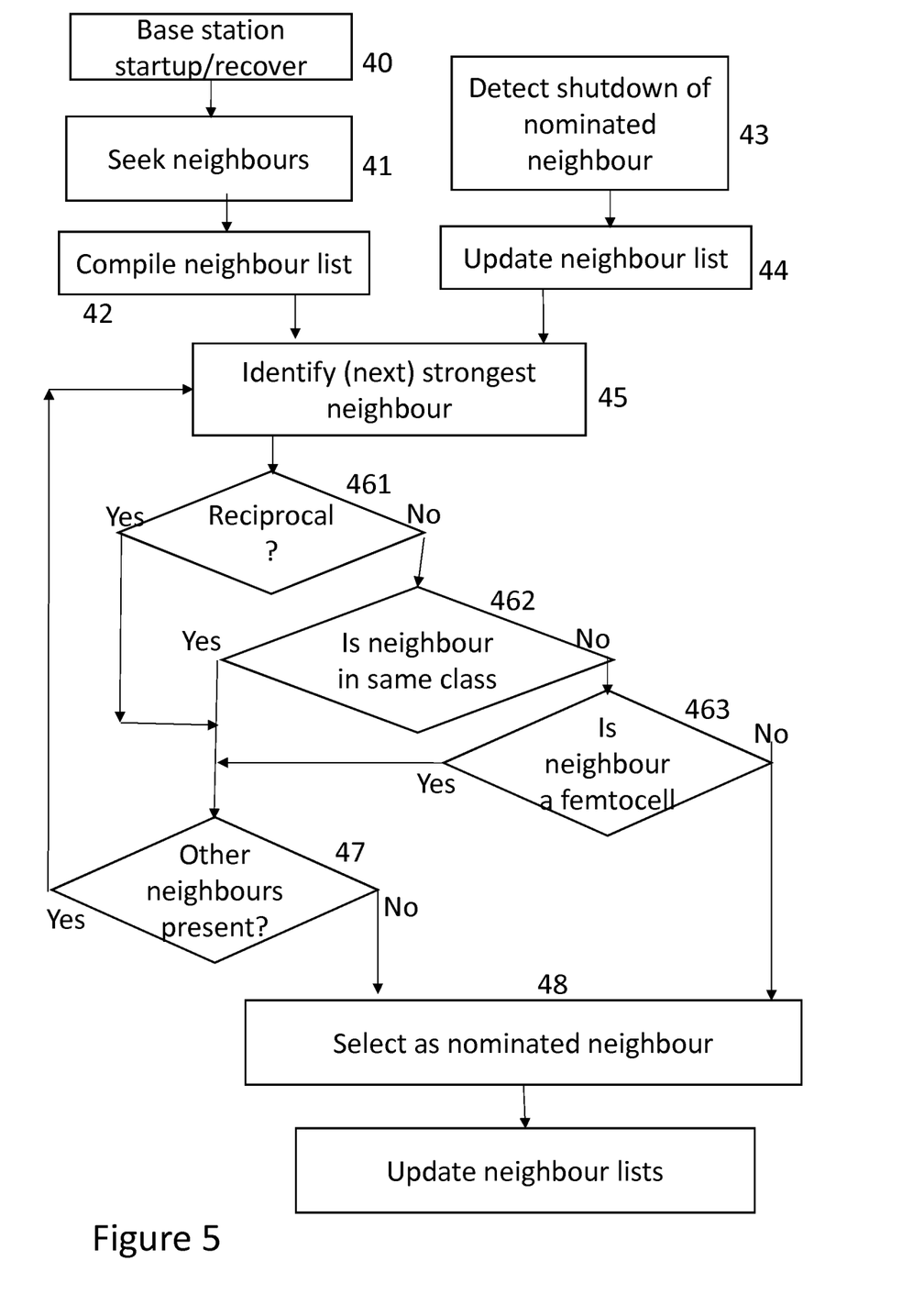
FIG. 5 depicts a flowchart illustrating the operation of the process of selecting a nominated neighbor.
Figure 6:
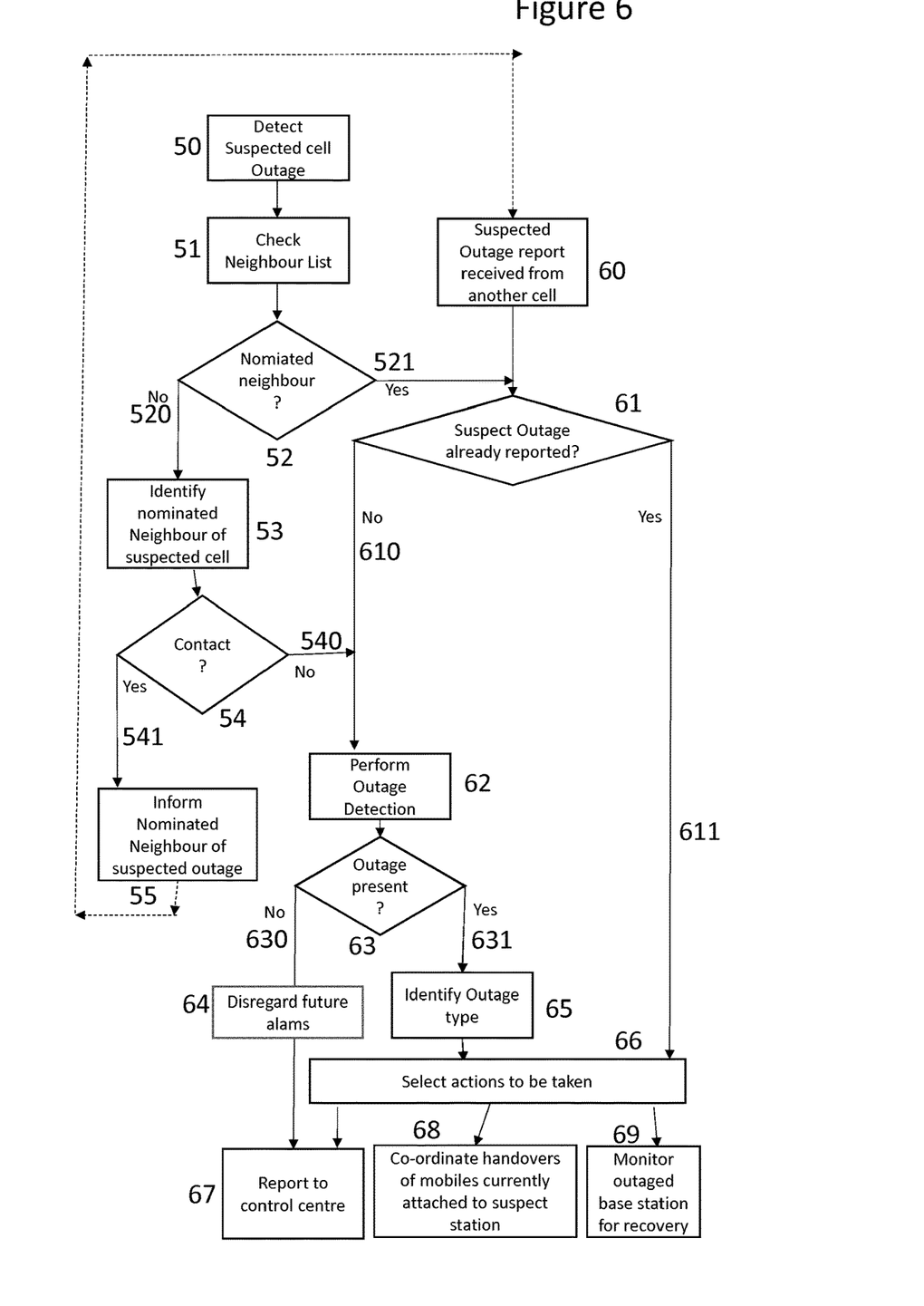
FIG. 6 depicts a flowchart illustrating the operation of the process.

FIG. 5 is a flow diagram illustrating the process of selecting a "nominated neighbor" for a base station. This process may be initiated in a number of circumstances, but in particular when a change in the network occurs because of the installation or removal of a base station (40, 43). The system operates in the same way, whether the change is deliberate (for instance the installation or removal of a femtocell) or unprompted (for instance a base station failure, or its recovery). The process may be performed by a functional element 39 of the base station 30, or an a management function 26 in the OAM 2, or by co-operation between the base station 30 and the OAM 2

When a base station 30 is first installed, or recovers from an outage, its neighbor seek function 35 is initiated (41) to identify other base stations in the vicinity and compiles a neighbor list 36 (42). These steps may be expedited if the base station is recovering from an outage, as it may first determine whether base stations already stored in its neighbor list before the outage occurred are still present.

During operation of the base station the neighbor seek function 35 operates from time to time to identify changes in the wireless environment, and in particular for other base stations beginning or ceasing to transmit their beacons, and the neighbor list 36 is updated accordingly.

If the base station ceases to detect its nominated neighbor (43) it first updates its neighbor list (44) to remove the base station from the list. A delay may be built in before this is done, in order to allow the nearest neighbor to recover if the outage is a transitory one.

Alternatively, the process may be initiated in a functional element 26 of the OAM 2 in response to its base station management system 22 detecting changes in the deployment or operation of the base stations for which it is responsible (40, 43).

In both the situations above (base station initiation (40-42) or loss of "nominated neighbor" (43-44)), it becomes necessary to select a nominated neighbor, and this is done according to the criteria set out below.

A base station could simply assign the neighbor base station with the highest received signal strength to be its "nominated neighbor" from the base station neighbor list (45), or it could be selected according to physical location, using GPS co-ordinates recorded in the neighbor list, or some other criterion. In these examples, the nominated neighbor could be the physically closest. However, the optimum neighbor may not always be closest (e.g. the closest base station may not have the best capabilities to make an outage decision). This information can be shared in a distributed manner, using multiple local copies 36 as illustrated or stored in a central Look up Table 6.

It is desirable, where possible, that the nominated neighbor allocation is not reciprocal that is to say if base station A is the nominated neighbor of base station B, the nominated neighbor selected for base station A should not be base station B. (In the example of FIG. 2, it is base station C). To this end, a test 461 is performed to check that the base station 30 is not itself already operating as the "nominated neighbor" of the base station currently under consideration (461) and, if that is the case, it is not selected if there are other candidates to be considered (47). This test will, of course, have a negative outcome if the base station is starting up or recovering, (40-42) as it will not have been available to be a nominated neighbor of another cell whilst it was not in operation. However, it may occur if the base station is seeking a new neighbor because it has lost contact with its previous one (43, 44).

This test ensures that, if both base stations A and B are subject to outages, they do not go undetected, because an alert can be raised through the nominated neighbor of base station A, namely Base station C. For the same reason, it is desirable that if an outage is reported for, for example, base station A, any base stations for which it is the nominated neighbor (base stations B and D in this example) are monitored more closely by their respective control centers (4) during that outage.

It will be noted that a base station may be the nominated neighbor of more than one other base station: for example base station A is the "nominated neighbor" of both base station B and base station D.

Another factor affecting the selection of nominated neighbor may be the type of backhaul system. The nominated neighbor does not necessarily belong to the same layer or the same network, and there may be some advantage in having it on a different layer (e.g. pico layer) or network to improve resilience. It is desirable that, where possible, the base station selected as nominated neighbor operates on a different backhaul system, so that in the event of a base station outage caused by failure of a backhaul system the nominated neighbor is not also disabled. To this end, a test 462 is performed to check that the base station 30 and the base station currently under consideration have the same backhaul system and, if that is the case, it is not selected if there are other candidates to be considered (47). (In the example of FIG. 2, only base station C has a nominated neighbor operating on the same backhaul system.)

In particular, femtocells, not being under the direct control of the network operator but being embodied in a private router system, can be switched on and off, and moved from place to place, without any pre-planning. This makes them unreliable as backup systems, and requires frequent updating of the neighbor list. It is thus preferable to only select such a base station as nominated neighbor of another base station if there is no other neighbor base station available (463, 47), or its recent use pattern suggests that it is unlikely to be removed.

The base station selected as "nominated neighbor" (48) is recorded in the neighbor list 36 and its identity can then be shared with other base stations through the OAM interface 38 (49).

Although the "nominated neighbor" of a given base station is arranged to monitor the behavior of that base station more closely than other base stations will, another neighbor may be the first to identify a base station as potentially in outage. Outage detection may be detection of a loss of radio signal from the base station, or through a failure to contact the base station through the backhaul network, for example during an attempted handover. In the event of such a suspected outage, the neighbor detecting it does not report the outage to the control centre directly, but discovers and contacts the "nominated neighbor" for the potential outage base station (via the backhaul connection). This process is illustrated in FIG. 6.

For the purposes of this illustration, base station A is the outaged base station, and the process will be described for the circumstances in which base station B detects the outage and also when base station C (the nominated neighbor of Base station A) itself detects the outage.

When a base station (B,C) detects a suspected outage in another base station (A) (50) it first retrieves the neighbor list 5 (or a locally stored copy) for the suspect base station (51) and determines whether the suspect base station A is one of those for which it is the nominated neighbor (52). In this case, the nominated neighbor of base station A is base station C, so if base station C detects the outage of base station A it follows the right hand path (521) in FIG. 6 (see 62), but if base station B detects the outage of base station A it follows the left hand path (520).

If the detecting base station B is not the nominated neighbor of the suspect base station A, it next identifies the address of the nominated neighbor (53). (It should be noted that the nominated neighbor C of the suspect base station A need not be on the neighbor list of the detecting base station B, but can be identified by inspection of the neighbor list of the suspect base station).

The detecting base station B next attempts to contact the nominated neighbor base station B (54), and if it is successful (path 541) transmits a message to the nominated neighbor base station B (55) to report the suspected outage.

If a base station C receives a report from another base station B (60) relating to a suspected outage of a base station A for which it is the nominated neighbor, or detects a suspected outage from such a base station (521) it first determines whether the suspected outage has already been reported or detected (61). If it is a newly-reported suspect outage (path 610), the nominated neighbor base station C coordinates any actions required by any other base stations or UEs to help make its decision on the suspected outage (62, 63, 64) and, once an outage decision is made, the nominated neighbor C coordinates any appropriate resolutions (65, 66, 67, 68, 69).

The nominated neighbor first conducts tests, if necessary in co-operation with other base stations and user terminals, to determine if the suspect base station is indeed in outage (62). This can help to eliminate false alarms, for example, brief loss of signal, or a failure of the equipment in the base station B making the report.

The nominated neighbor is responsible for coordinating a group decision in different time intervals to reduce the chance of intentional outages (caused by the user) or other instantaneous outages (system reboot, etc.) being detected. For example, it may "Ping" the base station, and/or perform an RF scan to check if the base station is active. It may also request other neighbor base stations to perform such tests and report the results. (e.g. select one of the distant neighbors that it cannot detect but the outage base station could detect), e.g. Base station B could ask Base station D.

If there is another base station connected to the backhaul, in addition to the suspect is base station, the output from that base station could be monitored to try and identify whether the backhaul is healthy. A nominated neighbor can exploit the capabilities of other entities (in particular those base stations in RF range of the suspected outage base station— the outage base station's neighbor list would be useful for building such a list). Other entities that the best neighbor could coordinate with include co-located Wi-Fi. In one particular example the best neighbor and the suspected outage base station both have co-located wifi. The best neighbor could connect directly to the collocated wifi of the suspected outage base station, to see if the backhaul has been the outage problem. Another option is simply for the co-located wifi of a device to reflect the backhaul status in its beacon messages. A nominated neighbor simply has to get a wifi device to scan and report the backhaul status advertised by the suspected outage base station.

Another check to see if this is an isolated outage. E.g. if base station B cannot inform the nominated neighbor (base station C) of base station A about a suspected outage, it may still be possible to communicate with the nominated neighbor of that base station (in this case base station D). A chain of such failures shows a likely widespread outage and the base station initiating this process could use this information to diagnose an outage and share the information with the Operations, Administration, and Maintenance (OAM) server 2.

If the nominated neighbor determines that the base station is not in outage (step 63, path 630), it can forward a report to the relevant network control center 2 (67), and may also be set to disregard future alarms for this particular base station for a certain time (e.g. 1 hour) and/or of a certain alarm type (64) to avoid repeated triggering of the outage response process (step 61) in case of false alarms.

Once an outage has been identified, (631), the handover and outage management system 37 of the "nominated neighbor" base station determines what actions need to be taken (66). These actions can include coordinating any handovers necessary from the outaged base station A (68) or contacting the OAM (2) through the OAM interface (38) and backhaul 32 (67). The OAM can then do any further investigations and decide to choose the most appropriate compensation technique based on the outage categorization. The nominated neighbor can then monitor for signs of the outaged base station becoming active again (69) so that it can initiate its restoration to the neighbor lists of other base stations, report its presence to the OAM 2, and initiate handover to it.

The invention claimed is:

1. A fault detection method for a cellular communications system comprising a plurality of base stations, the method comprising:
   maintaining, by each base station, a neighbor list to identify nearby base stations to which mobile terminals may be handed over, the neighbor list identifying, for each nearby base station, one nominated neighbor base station, wherein the respective neighbor list for each base station of the plurality of base stations identifies, for the same nearby base station, the same one nominated neighbor base station;
   if a first base station detects an outage or deterioration in signal quality of a second base station, retrieving, by the first base station, data from its neighbor list to identify the nominated neighbor base station of the second base station and transmitting a report of the detected outage or deterioration in signal quality to the nominated neighbor base station identified in the neighbor list; and
   on receiving the report from the first base station, responding, by the nominated neighbor base station, by monitoring for further potential outages or deterioration in signal quality of the second base station and for coordinating handover and outage management processes in response to received reports.

2. The fault detection process according to claim 1, wherein the nominated neighbor base station generates and transmits instructions to other base stations to initiate a handover and outage management process.

3. The fault detection process according to claim 1, wherein an automated allocation system operates to allocate nominated neighbor base stations to individual base stations.

4. The fault detection process according to claim 3, wherein the automated allocation system operates to select, for each base station, a nominated neighbor base station for which the base station is not itself the nominated neighbor.

5. The fault detection process according to claim 3, wherein in respect of a base station connected to a first backhaul system, a base station connected to a different backhaul system is preferentially selected as the nominated neighbor base station.

6. A cellular base station for a cellular communications system comprising a plurality of base stations, comprising:
   a neighbor detection processor for detecting a presence of neighboring base stations; and a store for recording identities of neighboring base stations so detected, and for recording for each neighboring base station one predetermined nominated neighbor base station, wherein each base station of the plurality of base station records, for the same identified neighboring base station, the same one predetermined nominated neighbor base station, wherein the neighbor detection processor is arranged to identify a deterioration in signal quality of a base station previously recorded in the store, to determine from a neighbor list the identity of the predetermined nominated neighbor of the base station suffering a deterioration in signal quality, and to generate a report for transmission to the nominated neighbor base station to initiate a handover and outage management process.

7. The cellular base station according to claim 6, wherein the neighbor detection processor is arranged to identify an outage of a base station previously recorded in the store by a failure to detect the outaged base station.

8. A cellular base station for a cellular communications system comprising a plurality of base stations, the cellular base station having a neighbor detection processor for detecting neighboring base stations, and a store for recording identities of neighboring base stations so detected, for recording for each neighboring base station a nominated neighbor base station, wherein each base station of the plurality of base station records, for the same identified neighboring base station, the same nominated neighbor base station, wherein the neighboring base station is itself recorded as the nominated neighbor base station for at least one other base station, the cellular base station comprising:
  a receiver adapted to receive an outage detection report from a first base station indicating an outage or deterioration in signal quality of a second base station for which the first base station is the nominated neighbor; and
  a processor adapted to respond to the outage detection report by initiating handover and outage management processes for the second base station.

9. The cellular base station according to claim 8, further comprising a handover management processor for managing handover of mobile terminals between base stations, the handover management processor being arranged to manage a handover and outage management process in response to reports of outages or deterioration in signal quality relating to the second base station, received from other base stations.

10. The cellular base station according to claim 9, wherein the handover management processor manages handover of mobile terminals between base stations, arranged such that if the neighbor detection processor identifies that the cellular base station is itself the nominated neighbor of the outaged base station, the handover management processor coordinates an outage management process.

11. The cellular base station according to claim 8, further comprising a neighbor determination processor for selecting from data in its neighbor list, a neighboring base station to be the nominated neighbor of the cellular base station, and for storing that identity in its neighbor list.

12. The cellular base station according to claim 11, arranged to broadcast the identity of the nominated neighbor base station to the nominated neighbor base station and to other neighboring base stations.

13. A cellular communications management processor for managing a cellular communications network, the cellular communications management processor comprising:
  a base station management system for receiving location data relating to individual base stations in the cellular communications network and a neighbor data store for storing location data of each base station in relation to neighboring base stations, the base station management system comprising:
    a nominated neighbor selection processor for selecting, in relation to each base station, one nominated neighbor base station and storing data relating to the nominated neighbor in the neighbor data store, and
    an outage management system for receiving reports from a first reporting base station relating to a second base station suffering an outage or deterioration in signal quality, identifying from the data in the neighbor data store the nominated neighbor base station of the second base station, generating a further report, and transmitting the further report to the nominated neighbor base station so identified to initiate a handover and outage management process.

14. The cellular communications management processor according to claim 13, wherein the nominated neighbor selection processor is arranged to broadcast an identity of the nominated neighbor base station to the nominated neighbor base station and to other neighboring base stations.

\* \* \* \* \*